United States Patent
Kontani et al.

(10) Patent No.: US 11,405,322 B2
(45) Date of Patent: Aug. 2, 2022

(54) IN-VEHICLE COMMUNICATION APPARATUS, COMMUNICATION PROGRAM, AND MESSAGE TRANSMISSION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Tsuyoshi Kontani, Yokkaichi (JP); Katsuya Ikuta, Yokkaichi (JP); Yuki Sano, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/258,854

(22) PCT Filed: Jul. 11, 2019

(86) PCT No.: PCT/JP2019/027512
§ 371 (c)(1),
(2) Date: Jan. 8, 2021

(87) PCT Pub. No.: WO2020/017424
PCT Pub. Date: Jan. 23, 2020

(65) Prior Publication Data
US 2021/0273887 A1 Sep. 2, 2021

(30) Foreign Application Priority Data
Jul. 17, 2018 (JP) .............................. JP2018-134508

(51) Int. Cl.
*H04L 47/2425* (2022.01)
*B60R 16/023* (2006.01)
(Continued)

(52) U.S. Cl.
CPC ........ *H04L 47/2433* (2013.01); *B60R 16/023* (2013.01); *H04L 12/40* (2013.01); *H04L 47/2441* (2013.01); *H04L 2012/40273* (2013.01)

(58) Field of Classification Search
None
See application file for complete search history.

(56) References Cited

U.S. PATENT DOCUMENTS

2009/0180477 A1   7/2009  Akahane
2011/0208884 A1*  8/2011  Horihata .......... H04L 12/40143
                                                        710/105
(Continued)

FOREIGN PATENT DOCUMENTS

JP    2011-91711 A    5/2011
JP    2015-67187 A    4/2015
(Continued)

OTHER PUBLICATIONS

International Search Report, Application No. PCT/JP2019/027512, dated Sep. 3, 2019. ISA/Japan Patent Office.

*Primary Examiner* — Kenny S Lin
(74) *Attorney, Agent, or Firm* — Honigman LLP (57) ABSTRACT

Provided are an in-vehicle communication apparatus, a communication program, and a message transmission method. The in-vehicle communication apparatus according is connected to another apparatus via a plurality of communication lines, and includes a plurality of communication units that are provided respectively for the communication lines, and transmit/receive a message via the communication (Continued)

lines, a classification processing unit that performs processing for classifying messages that are to be transmitted to the other apparatus, into a plurality of groups in accordance with priorities of the messages and a message transmission processing unit that distributes messages classified into each of the plurality of groups, to one or more communication units allocated to the group, and the number of communication units allocated to a group into which a higher-priority message is classified is larger than the number of communication units allocated to a group into which a lower-priority message is classified.

7 Claims, 9 Drawing Sheets

(51) Int. Cl.
*H04L 12/40* (2006.01)
*H04L 47/2441* (2022.01)

(56) References Cited

U.S. PATENT DOCUMENTS

| | | | |
|---|---|---|---|
| 2011/0249685 A1* | 10/2011 | Liang | H04L 47/6215 |
| | | | 370/449 |
| 2012/0307628 A1 | 12/2012 | Maeda et al. | |
| 2019/0110174 A1* | 4/2019 | Way | G07C 5/008 |
| 2020/0234101 A1* | 7/2020 | Hanselmann | H04L 12/40 |

FOREIGN PATENT DOCUMENTS

| | | | | |
|---|---|---|---|---|
| WO | WO-2018182591 A1 * | 10/2018 | | H04W 4/40 |
| WO | WO-2018182728 A1 * | 10/2018 | | G08G 1/096725 |

* cited by examiner

Legend
A= Communication unit
B= Communication buffer

IN-VEHICLE COMMUNICATION APPARATUS, COMMUNICATION PROGRAM, AND MESSAGE TRANSMISSION METHOD

CROSS-REFERENCE TO RELATED APPLICATIONS

This application is the U.S. national stage of PCT/JP2019/027512 filed on Jul. 11, 2019, which claims priority of Japanese Patent Application No. JP 2018 134508 filed on Jul. 17, 2018, the contents of which are incorporated herein.

TECHNICAL FIELD

This disclosure relates to an in-vehicle communication apparatus that performs communication in a vehicle, a communication program that is executed by this in-vehicle communication apparatus, and a message transmission method that is performed by this in-vehicle communication apparatus.

BACKGROUND

Recent years has seen a trend of an increase in the number of ECUs (Electronic Control Units) mounted in a vehicle. Each ECU communicates with another ECU to transmit/receive information to/from the other ECU, and performs various types of processing. Therefore, as the number of ECUs in a vehicle increases, the number of communication lines in the vehicle that are provided for the ECUs to perform communication increases, leading to concerns regarding an increase in the weight of the vehicle, a decrease in the space in the vehicle in which the communication lines are arranged, and the like.

JP 2015-67187A describes a vehicle control system configured such that the inside of a vehicle is divided into a plurality of regions, and, in each of the regions, a plurality of function ECUs are connected to a relay ECU by a first network, and a plurality of relay ECUs are connected by a second network.

However, in the vehicle control system described in JP 2015-67187A, when the communication amount between a plurality of function ECUs provided in different regions increases, there is a risk that the communication band between the relay ECUs that relay the communication between the function ECUs becomes congested, and a communication delay occurs.

The present disclosure has been made in view of such circumstances, and aims to provide an in-vehicle communication apparatus, a communication program, and a message transmission method that can suppress the occurrence of a delay in transmission of a higher-priority message.

SUMMARY

An in-vehicle communication apparatus according to one aspect of the present disclosure is connected to another apparatus via a plurality of communication lines, and includes: a plurality of communication units that are provided respectively for the communication lines, and transmit/receive a message via the communication lines, a classification processing unit that performs processing for classifying messages that are to be transmitted to the other apparatus, into a plurality of groups in accordance with priorities of the messages, and a message transmission processing unit that distributes messages classified into each of the plurality of groups, to one or more communication units allocated to the group, and thereby transmits the messages to the other apparatus, and the number of communication units allocated to a group into which a higher-priority message is classified is larger than the number of communication units allocated to a group into which a lower-priority message is classified.

A communication program according to one aspect of the present disclosure causes an in-vehicle communication apparatus that is to be connected to another apparatus via a plurality of communication lines, and includes a plurality of communication units that are provided respectively for the communication lines, and transmit/receive a message via the communication lines, to perform processing for classifying messages that are to be transmitted to the other apparatus, into a plurality of groups in accordance with priorities of the messages, and distributing messages classified into each of the plurality of groups, to one or more communication units allocated to the group, and thereby transmitting the messages to the other apparatus, and the number of communication units allocated to a group into which a higher-priority message is classified is larger than the number of communication units allocated to a group into which a lower-priority message is classified.

A message transmission method according to another aspect of the present disclosure includes: connecting an apparatus to another apparatus via a plurality of communication lines, classifying messages that are to be transmitted to the other apparatus, into a plurality of groups in accordance with priorities of the messages, allocating, for each of the groups, one or more communication units out of a plurality of communication units that are provided respectively for the communication lines, and transmit/receive messages via the communication lines, and distributing messages classified into each of the plurality of groups, to one or more communication units allocated to the group, thereby transmitting the messages to the other apparatus, and the number of communication units allocated to a group into which a higher-priority message is classified is larger than the number of communication units allocated to a group into which a lower-priority message is classified.

Note that the present application can be realized not only as an in-vehicle relay apparatus that includes the above-described characteristic processing units, but also as a communication method that includes the above-described characteristic processing as steps, or a communication program for causing a computer to execute the steps. In addition, the present application can be realized as a semiconductor integrated circuit that realizes a portion or the entirety of the in-vehicle relay apparatus, or another apparatus or system that includes the in-vehicle relay apparatus.

Advantageous Effects of Invention

According to the above aspects, it is possible to suppress the occurrence of a delay in transmission of a higher-priority message.

DETAILED DESCRIPTION OF PREFERRED EMBODIMENTS

First, embodiments of the present disclosure will be listed and described. At least some of the embodiments to be described below may be suitably combined.

An in-vehicle communication apparatus according to one aspect of the present disclosure is connected to another apparatus via a plurality of communication lines, and includes: a plurality of communication units that are provided respectively for the communication lines, and transmit/receive a message via the communication lines, a classification processing unit that performs processing for classifying messages that are to be transmitted to the other apparatus, into a plurality of groups in accordance with priorities of the messages, and a message transmission processing unit that distributes messages classified into each of the plurality of groups, to one or more communication units allocated to the group, and thereby transmits the messages to the other apparatus, and the number of communication units allocated to a group into which a higher-priority message is classified is larger than the number of communication units allocated to a group into which a lower-priority message is classified.

In this aspect, the in-vehicle communication apparatus is connected to another apparatus via a plurality of communication lines. The in-vehicle communication apparatus includes a plurality of communication units that transmit/receive a message to/from the other apparatus via the communication lines. The in-vehicle communication apparatus classifies messages that are to be transmitted to the other apparatus, into a plurality of groups in accordance with the priorities of these messages. One or more communication units are allocated to each group, and a larger number of communication units are allocated to a group into which a higher-priority message is classified, and a smaller number of communication units are allocated to a group into which a lower-priority message is classified. The in-vehicle communication apparatus distributes messages classified into each of the groups, to one or more communication units allocated to this group, and thereby transmits the messages to the other apparatus.

Accordingly, higher-priority messages are transmitted to the other apparatus using a larger number of communication lines, and lower-priority messages are transmitted to the other apparatus using a smaller number of communication lines. Thus, it is possible to increase the communication capacity for higher-priority messages, and suppress the occurrence of a delay in transmission of higher-priority messages.

The message transmission processing unit preferably distributes messages to a plurality of communication units in a predetermined order.

In this aspect, when a plurality of communication units are allocated to one group, messages classified into this group are supplied to the plurality of communication units in a predetermined order, and the messages are thereby transmitted from the plurality of communication units in the predetermined order. Accordingly, the in-vehicle communication apparatus can transmit messages by equally using a plurality of communication units allocated to each group.

When a plurality of messages classified into a plurality of groups are supplied from the message transmission processing unit, the communication unit preferably transmits a higher-priority message first.

In this aspect, when a plurality of messages of a plurality of groups are supplied simultaneously, the communication units of the in-vehicle communication apparatus preferentially transmit a higher-priority message first, and then transmit a lower-priority message. Accordingly, it is possible to suppress the occurrence of a delay in transmission of a higher-priority message without being interrupted by a lower-priority message.

An in-vehicle communication apparatus according to another aspect of the present disclosure is connected to another apparatus via two communication lines, and includes two communication units that are provided respectively for the communication lines, and transmit/receive a message via the communication lines, a classification processing unit that performs processing for classifying messages that are to be transmitted to the other apparatus, into two groups in accordance with priorities of the messages, and a message transmission processing unit that distributes messages classified into each of the two groups, to one or more communication units allocated to the group, and thereby transmits the messages to the other apparatus, and two communication units are allocated to a group into which a higher-priority message is classified, and one communication unit is allocated to a group into which a lower-priority message is classified.

In this aspect, the in-vehicle communication apparatus and the other apparatus are connected via two communication lines. The in-vehicle communication apparatus includes two communication units that transmit/receive messages to/from the other apparatus via the communication lines. The in-vehicle communication apparatus classifies messages that are to be transmitted to the other apparatus, into two groups in accordance with the priorities assigned to these messages. Two communication units are allocated to a group into which a higher-priority message is classified, and one communication unit is allocated to a group into which a lower-priority message is classified. The in-vehicle communication apparatus distributes messages classified into each of the two groups, to one or more communication units allocated to the group, and thereby transmits the messages to the other apparatus.

Accordingly, higher-priority messages are transmitted to the other apparatus using two communication lines, and lower-priority messages are transmitted to the other apparatus using one communication line. Thus, it is possible to increase the communication capacity for higher-priority messages, and suppress the occurrence of a delay in transmission of a higher-priority message.

A communication program according to another aspect of the present disclosure causes an in-vehicle communication apparatus that is to be connected to another apparatus via a plurality of communication lines, and includes a plurality of communication units that are provided respectively for the communication lines, and transmit/receive a message via the communication lines, to perform processing for classifying messages that are to be transmitted to the other apparatus, into a plurality of groups in accordance with priorities of the messages, and distributing messages classified into each of the plurality of groups, to one or more communication units allocated to the group, and thereby transmitting the messages to the other apparatus, and the number of communication units allocated to a group into which a higher-priority message is classified is larger than the number of communication units allocated to a group into which a lower-priority message is classified.

In this aspect, similarly to the first aspect, it is possible to suppress the occurrence of a delay in transmission of a higher-priority message.

A message transmission method according to another aspect of the present disclosure includes: connecting an apparatus to another apparatus via a plurality of communication lines, classifying messages that are to be transmitted to the other apparatus, into a plurality of groups in accordance with priorities of the messages, allocating, for each of the groups, one or more communication units out of a plurality of communication units that are provided respectively for the communication lines, and transmit/receive messages via the communication lines, and distributing messages classified into each of the plurality of groups, to one or more communication units allocated to the group, thereby transmitting the messages to the other apparatus, and the number of communication units allocated to a group into which a higher-priority message is classified is larger than the number of communication units allocated to a group into which a lower-priority message is classified.

In this aspect, similarly to the first aspect, it is possible to suppress the occurrence of a delay in transmission of a higher-priority message.

Specific examples of an in-vehicle communication apparatus according to embodiments of the present disclosure will be described below with reference to the drawings. Note that the present disclosure is not limited to illustrations of these, but is indicated by the claims, and all changes that come within the meaning and range of equivalency of the claims are intended to be embraced therein.

System Configuration

Figure 1:
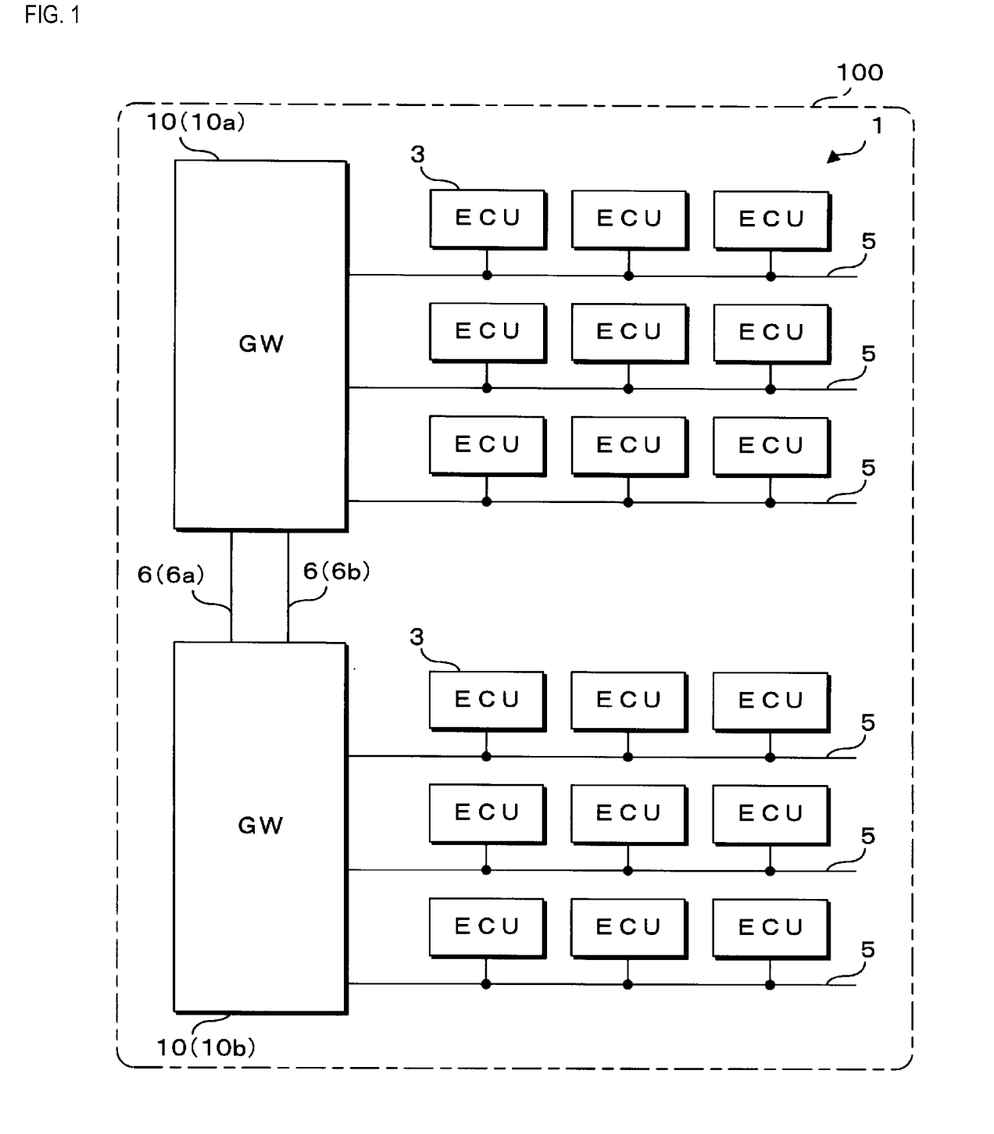
FIG. 1 is a block diagram showing a configuration of an in-vehicle communication system according to an embodiment of the present disclosure.

FIG. 1 is a block diagram showing a configuration of an in-vehicle communication system according to an embodiment. An in-vehicle communication system 1 according to a first embodiment is a system that includes, in a vehicle 100, a plurality of ECUs 3 and a plurality of GWs (Gate Ways) 10, and in which the plurality of ECUs 3 and GWs 10 transmit/receive messages via communication lines 5 and 6. As an example, FIG. 1 shows the configuration of the in-vehicle communication system 1 in which two GWs 10 are mounted in the vehicle 100, and the two GWs 10 are connected via two communication lines 6, three communication lines 5 are connected to each of the GWs 10, and three ECUs 3 are connected to each of the communication lines 5. In the following description, when the two GWs 10 need to be distinguished from each other, different reference numerals are used, for example, one is defined as a GW 10a, and the other is defined as a GW 10b, as shown in FIG. 1. Similarly, as necessary, the two communication lines 6 are distinguished from each other as communication lines 6a and 6b. Note that the number of ECUs 3, the number of GWs 10, the number of communication lines 5, and the number of communication lines 6 that are included in the in-vehicle communication system 1, the connection modes of the apparatuses, the network configuration, and the like are not limited to those illustrated.

The ECUs 3 mounted in the vehicle 100 may include various ECUs such as an ECU for controlling the operation of the engine of the vehicle 100, an ECU for controlling the locking/unlocking of the doors, an ECU for controlling on/off of lights, an ECU for controlling the operation of the air bags, and an ECU for controlling the operation of the ABS (Antilock Brake System). Each ECU 3 is connected to one of the communication lines 5 arranged in the vehicle 100, and can transmit/receive messages to/from other ECUs 3 via the communication lines 5 and the GWs 10.

Each of the GWs 10 is connected to a plurality of communication lines 5, and can transmit/receive messages to/from a plurality of ECUs 3 via the communication lines 5. A GW 10 that has received a message transmitted by an ECU 3 determines whether or not the received message needs to be relayed, based on the ID assigned to the message, and transmits the message, if it needs to be relayed, using a communication line 5 different from the communication line 5 from which the message was received. Therefore, the GW 10 has a destination map that stores a correspondence relation between an ID assigned to a message and a communication line 5 through which this message is to be transmitted.

In the in-vehicle communication system 1, a message can be transmitted from an ECU 3 connected to one GW, namely the GW 10a to an ECU 3 connected to the other GW, namely the GW 10b. In this case, the GW 10a that has received a message from the ECU 3 determines that the message is to be transmitted to the other GW, namely the GW 10b, based on the ID assigned to this message, and outputs this message from a communication line 6, so as to transmit it to the GW 10b. The GW 10b that has received the message from the GW 10a via the communication line 6 determines which communication line 5 the message is to be relayed to, based on the ID assigned to the received message, and transmits this message from the communication line 5 to which the message is to be relayed. The same applies when a message is transmitted from the GW 10b to the GW 10a.

In addition, in the in-vehicle communication system 1 according to the first embodiment, the two GWs 10 are connected via the two communication lines 6. The two communication lines 6 comply with the same communication standard, and, in this embodiment, a message is transmitted/received in compliance with the CAN (Controller Area Network) communication standard. In addition, in this embodiment, the communication speed is the same regardless of which communication line 6 is used. Note that the GWs 10 may also be configured to transmit/receive a message in compliance with the communication standard of Ethernet (registered trademark), FlexRay, or the like, and the communication speeds of the two communication lines 6 may be different.

When one of the GWs 10 transmits a message to the other GW 10, one of the two communication lines 6 is selected, and this message is transmitted from the selected communication line 6. Each of the GWs 10 according to this embodiment classifies a message that is to be transmitted to the other GW 10, into a first group of higher-priority messages or a second group of lower-priority messages, in accordance with the priority of the message. The two communication lines 6 are allocated to the first group of higher-priority messages, and a message classified into the first group is transmitted from one of the two communication lines 6. Conversely, only one communication line 6 is allocated to the second group of lower-priority messages, and a message classified into the second group is transmitted from this one communication line 6. Note that the two GWs 10 do not transmit messages in synchronization, but transmit messages based on individual determinations. Therefore, there is the possibility that messages will be transmitted through the communication lines 6 by the two GWs 10 simultaneously, resulting in collision of message transmission. In this case, message transmission arbitration processing is performed in accordance with the CAN communication standard.

Apparatus Configuration

Figure 2:
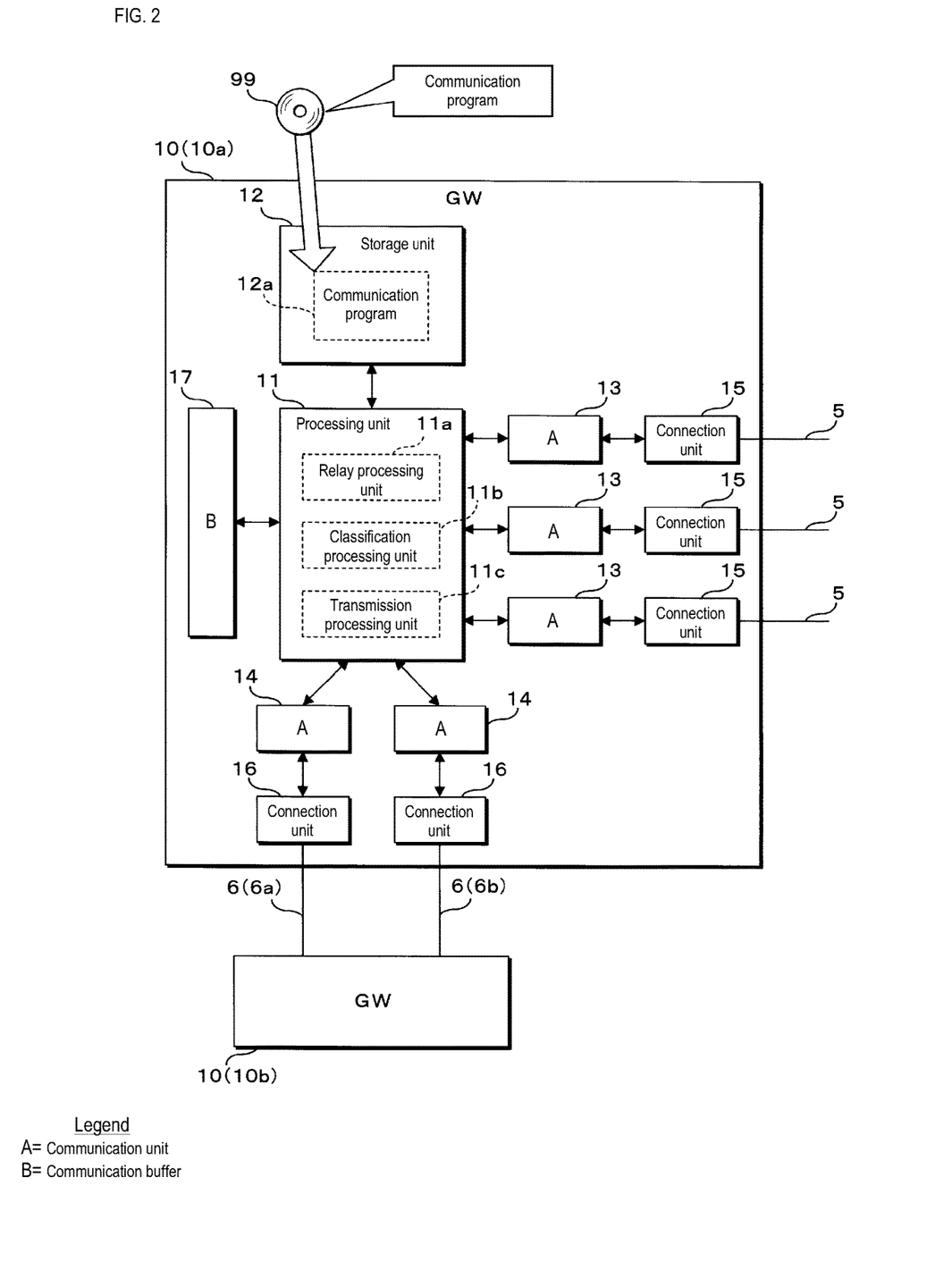
FIG. 2 is a block diagram showing a configuration of a GW according to an embodiment of the present disclosure.

FIG. 2 is a block diagram showing a configuration of a GW 10 according to this embodiment. Note that the two GWs 10 of the in-vehicle communication system 1 according to this embodiment have substantially the same configuration, and thus FIG. 2 illustrates a detailed configuration of only one GW, namely the GW 10a, and thus a description of a detailed configuration of the other GW, namely the GW 10b is omitted. Each of the GWs 10 according to this embodiment is configured to include a processing unit (processor) 11, a storage unit (storage) 12, communication units (transceivers) 13 and 14, connection units (connectors) 15 and 16, a communication buffer 17, and the like.

The processing unit 11 is constituted by a computation processing apparatus such as a CPU (Central Processing Unit) or MPU (Micro-Processing Unit). The processing unit 11 can perform various types of processing by reading out and executing a program stored in the storage unit 12. In this embodiment, the processing unit 11 performs processing for relaying a message between communication lines 5, processing for classifying a message that is to be transmitted to the other GW 10, processing for transmitting a classified message to the other GW 10, and the like, by reading out and executing a communication program 12a stored in the storage unit 12.

The storage unit 12 is constituted by a non-volatile memory element such as a flash memory or EEPROM (Electrically Erasable Programmable Read Only Memory). The storage unit 12 stores various programs that are executed by the processing unit 11, and various types of data required for processing that is performed by the processing unit 11. In this embodiment, the storage unit 12 stores the communication program 12a that is executed by the processing unit 11. Note that the communication program 12a may also be written in the storage unit 12 in a manufacturing stage of the GW 10, for example, or may also be distributed by a remote server apparatus or the like and obtained by the GW 10 through communication, for example, or the program recorded in a recording medium 99 such as a memory card or an optical disk may also be read out by the GW 10 and stored in the storage unit 12, for example, or the program recorded in the recording medium 99 may also be read out by a writing apparatus and written in the storage unit 12 of the GW 10 by the writing apparatus, for example. The communication program 12a may also be provided in a mode of being distributed via a network, or may also be provided in a mode of being recorded in the recording medium 99.

The connection units 15 and 16 are connection units for detachably connecting the communication lines 5 and 6 to the GW 10, and are so-called connectors. The connection units 15 and 16 are configured to be appropriate for the shapes, communication standards, and the like of the communication lines 5 and 6 connected thereto. Note that FIG. 2 illustrates three connection units 15 for connecting, to the GW 10, the communication lines 5 for communicating with the ECUs 3 and two connection units 16 for connecting, to the GW 10, the communication lines 6 for communicating with the other GW 10, using different reference numerals. However, when communication between the GW 10 and each ECU 3 and communication between the two GWs 10 are performed in compliance with the same communication standard, and the communication lines 5 and 6 comply with the same standard, the connection units 15 and 16 may substantially be the same.

The communication units 13 and 14 perform processing related to transmission/receiving of a message via the communication lines 5 and 6 connected to the connection units 15 and 16, respectively. In this embodiment, the communication units 13 and 14 transmit/receive a message in accordance with the CAN communication standard. The communication units 13 and 14 may be constituted by communication ICs such as CAN transceivers. The communication units 13 and 14 convert an electrical signal on the communication lines 5 and 6 into digital data by periodically sampling and obtaining the potentials of the communication lines 5 and 6 connected to the connection units 15 and 16, respectively, and supply this digital data as a received message to the processing unit 11. In addition, the communication units 13 and 14 convert a message supplied as digital data from the processing unit 11, into an electrical signal, and output the converted electrical signal to the communication lines 5 and 6 connected to the connection units 15 and 16, respectively, thereby transmitting the message. Note that FIG. 2 illustrates three communication units 13 that communicate with the ECUs 3 and two communication units 14 that communicate with the other GW 10, using different reference numerals. However, when communication between the GW 10 and each ECU 3 and communication between the two GWs 10 are performed in compliance with the same communication standard, the communication units 13 and 14 may substantially be the same.

The communication buffer 17 is constituted by a data-rewritable memory element such as an SRAM (Static Random Access Memory) or DRAM (Dynamic Random Access Memory). The communication buffer 17 temporarily stores a message received from an ECU 3 or the other GW 10. In the GW 10 according to this embodiment, two buffers, namely a first buffer and a second buffer are provided in the communication buffer 17, and a message to be transmitted to the other GW 10 is stored in one of the buffers in accordance with a classification result.

In addition, in the GW 10 according to this embodiment, a relay processing unit 11a, a classification processing unit 11b, a transmission processing unit 11c, and the like are realized as software-like functional blocks in the processing unit 11, as a result of the processing unit 11 reading out and executing the communication program 12a stored in the storage unit 12. The relay processing unit 11a performs processing for relaying a message received from an ECU 3 by a communication unit 13, to another ECU 3. The relay processing unit 11a obtains the ID assigned to the message received by the communication unit 13, refers to the destination map, and confirms the destination associated with the ID using the destination map. The relay processing unit 11a supplies the message to a communication unit 13 that is a destination designated in the destination map, and makes the communication unit 13 transmit the message to the communication lines 5. In addition, when the destination designated in the destination map is the other GW 10, the relay processing unit 11a supplies the message to be transmitted to the other GW 10, to the classification processing unit 11b.

When the message to be transmitted to the other GW 10 is supplied from the relay processing unit 11a, the classification processing unit 11b classifies this message into the first group of higher-priority messages or the second group of lower-priority messages, based on the ID assigned to the message. An ID assigned to a message in the CAN communication standard indicates the priority of the message, and a smaller value indicates a higher priority, and a larger value indicates a lower priority. The classification processing unit 11b classifies the message into one of the two groups in accordance with the priority, by comparing the ID assigned to the message with a predetermined threshold value. A configuration can be adopted in which, for example, if the ID is a three-digit hexadecimal, messages with IDs of 0x000 to 0x2FF are classified into the first group, and messages with IDs of 0x300 to 0xFFF are classified into the second group. The classification processing unit 11b stores messages classified into the first group, in the first buffer of the communication buffer 17, and stores messages classified into the second group, in the second buffer of the communication buffer 17. Note that the first buffer and the second buffer are FIFO (First In First Out) buffers.

The transmission processing unit 11c obtains, from the first buffer or the second buffer of the communication buffer 17, a message that is to be transmitted to the other GW 10 and has been classified by the classification processing unit 11b, and supplies the message to a communication unit 14, thereby performing message transmission processing. Note that FIG. 2 illustrates one transmission processing unit 11c, but the same number of transmission processing units 11c as the number of groups into which messages are classified are provided in the processing unit 11 of the GW 10. Specifically, in this embodiment, two transmission processing units 11c are provided in the processing unit 11, one transmission processing unit 11c performing processing for transmitting a message stored in the first buffer, and the other transmission processing unit 11c performing processing for transmitting a message stored in the second buffer. The two transmission processing units 11c independently perform message transmission processing in parallel.

In this embodiment, the transmission processing unit 11c corresponding to the first group alternately transmits higher-priority messages from the two communication lines 6 by alternately supplying messages stored in the first buffer of the communication buffer 17, to the two communication units 14. In addition, the transmission processing unit 11c corresponding to the second group transmits lower-priority messages from one predetermined communication line 6, by supplying messages stored in the second buffer of the communication buffer 17, to one predetermined communication unit 14. At this time, if collision with message transmission of the other GW 10 occurs, processing such as message arbitration and retransmission is performed by the communication units 14, and the transmission processing units 11c are not involved in processing such as message arbitration and retransmission.

Message Transmission Processing

Figure 3:
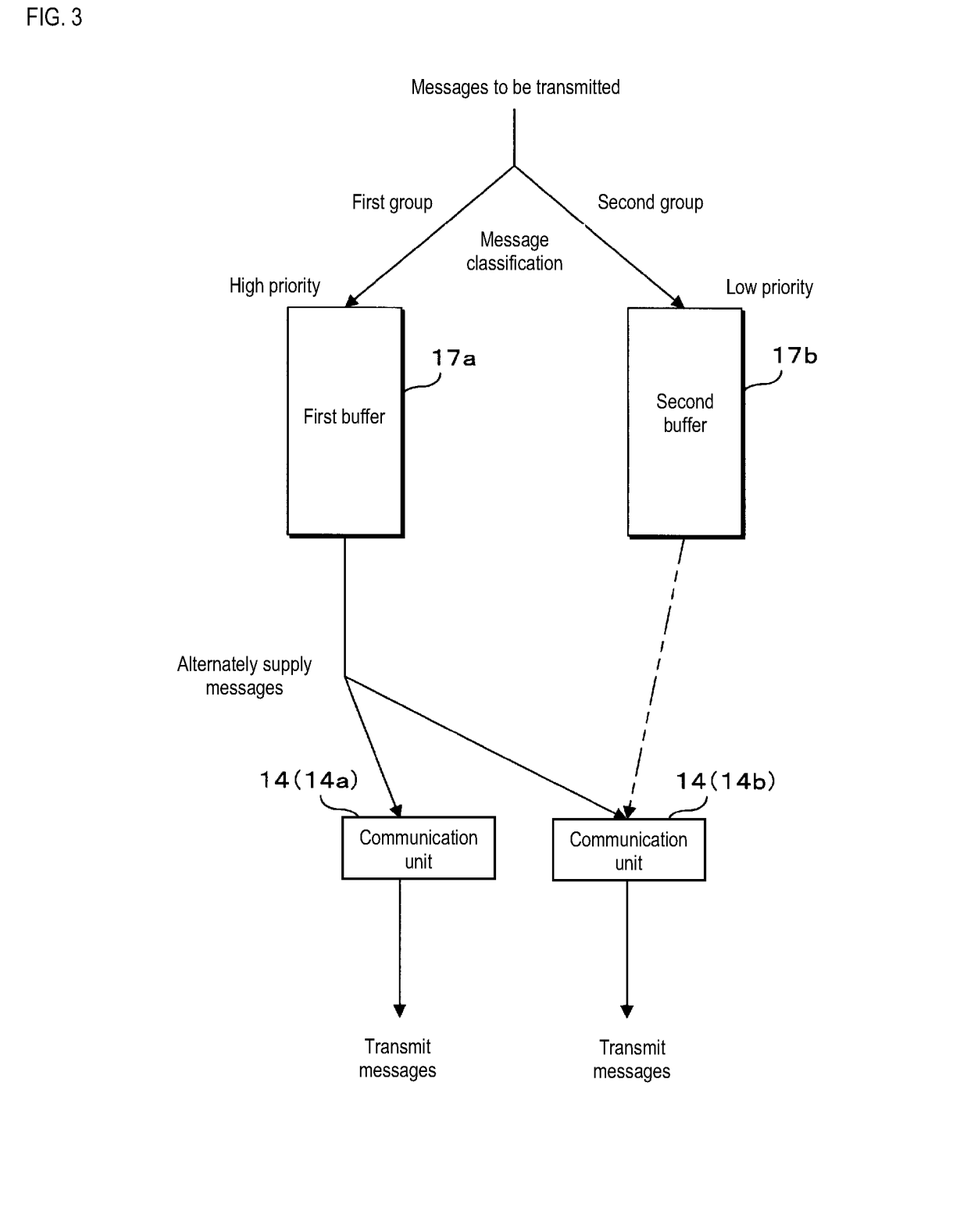
FIG. 3 is a schematic diagram for illustrating processing that is performed by a GW according to an embodiment of the present disclosure, the processing being for transmitting messages to another GW.

FIG. 3 is a schematic diagram for illustrating processing that is performed by one GW 10 according to this embodiment, the processing being for transmitting a message to the other GW 10. Note that the two communication units 14 of the GW 10, if they need to be distinguished from each other, will be described below with different reference numerals, for example, communication units 14a and 14b. The GW 10 according to this embodiment receives a message from an ECU 3 connected thereto via a communication line 5, and relays this message to another ECU 3. At this time, when the ECU 3 to which the message is to be relayed is connected to the other GW 10, the GW 10 transmits this message to the other GW 10. The classification processing unit 11b of the GW 10 classifies this message to be transmitted to the other GW 10, into the first group of higher-priority messages or the second group of lower-priority messages, based on the ID assigned to the message. The classification processing unit 11b stores a message classified into the first group, in a first buffer 17a of the communication buffer 17, and a message classified into the second group, in a second buffer 17b.

The transmission processing unit 11c provided in association with the first group into which the classification processing unit 11b classifies messages obtains messages stored in the first buffer 17a in order from the oldest message, and alternately supplies the messages to the two communication units 14a and 14b of the GW 10, thereby transmitting the messages to the other GW 10. The transmission processing unit 11c provided in association with the second group obtains messages stored in the second buffer 17b in order from the oldest message, and supplies the messages to one predetermined communication unit 14, namely the communication unit 14b of the GW 10, thereby transmitting the messages to the other GW 10. Message transmission processing is performed by the two transmission processing units 11c asynchronously and in parallel.

When a message is supplied from the transmission processing unit 11c, a communication unit 14 outputs this message to the corresponding communication line 6, and thereby transmits the message to the other GW 10. Here, one communication unit 14, namely the communication unit 14a to which only messages from the first buffer 17a are supplied transmits supplied messages in order. There is the possibility that the other communication unit 14, namely the communication unit 14b to which messages are supplied from both the first buffer 17a and the second buffer 17b will be supplied with a message from the first buffer 17a and a message from the second buffer 17b simultaneously. In such a case, the communication unit 14b transmits a higher-priority message (in other words, a message supplied from the first buffer 17a) first out of the two messages supplied simultaneously, and then transmits a lower-priority message (in other words, a message supplied from the second buffer 17b).

Figure 4:
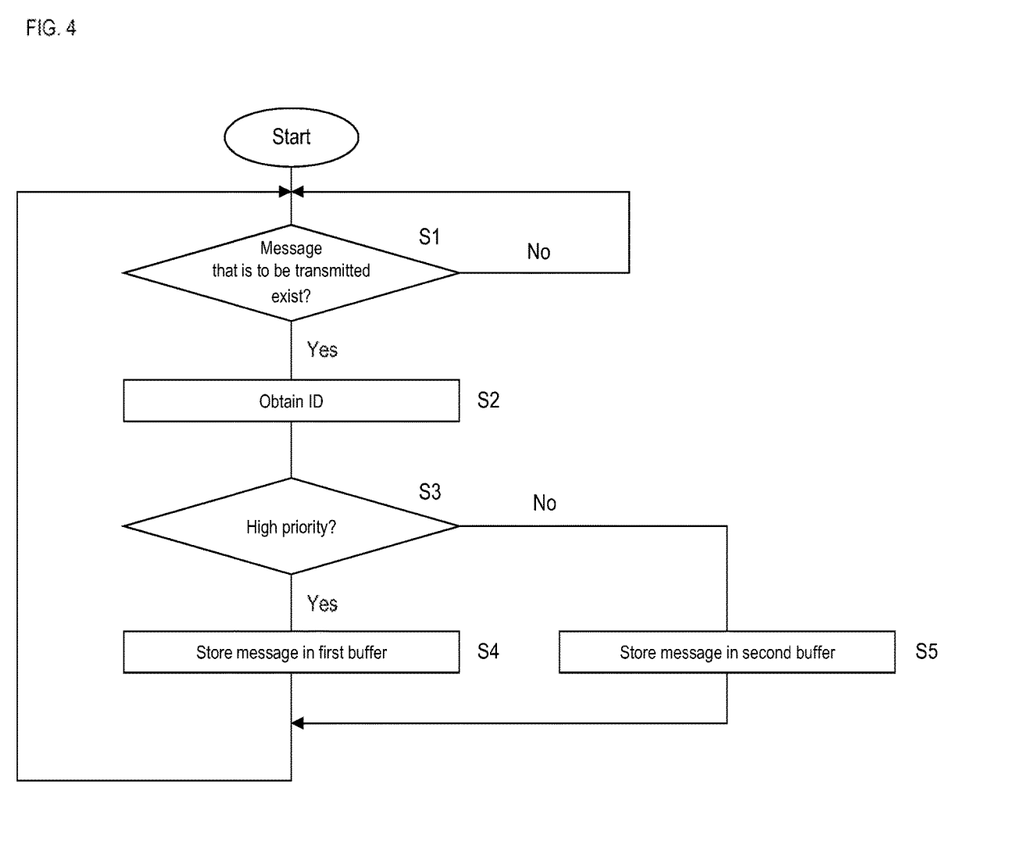
FIG. 4 is a flowchart showing the procedure of message classification processing that is performed by a GW according to an embodiment of the present disclosure.

FIG. 4 is a flowchart showing the procedure of message classification processing that is performed by a GW 10 according to this embodiment. The classification processing unit 11b of the processing unit 11 of the GW 10 according to this embodiment determines the presence or absence of any message that is to be transmitted to the other GW 10 (step S1). If there is no message to be transmitted to the other GW 10 (step 1: NO), the classification processing unit 11b waits until a message to be transmitted to the other GW 10 is supplied. When there is a message to be transmitted to the other GW 10 (step S1: YES), the classification processing unit 11b obtains the ID included in this message (step S2).

The classification processing unit 11b uses the ID obtained in step S2 as priority information, and determines whether or not the message that is to be transmitted is of a high priority, based on a comparison between the ID and a predetermined threshold (step S3). If the message is of a high priority (step S3: YES), the classification processing unit 11b classifies this message into the first group, and stores the message in the first buffer 17a corresponding to the first group (step S4), and returns the procedure to step S1. If the message is not of a high priority (step S3: NO), in other words, if the message is of a low priority, the classification processing unit 11b classifies this message into the second group, stores the message in the second buffer 17b corresponding to the second group (step S5), and returns the procedure to step S1.

Figure 5:
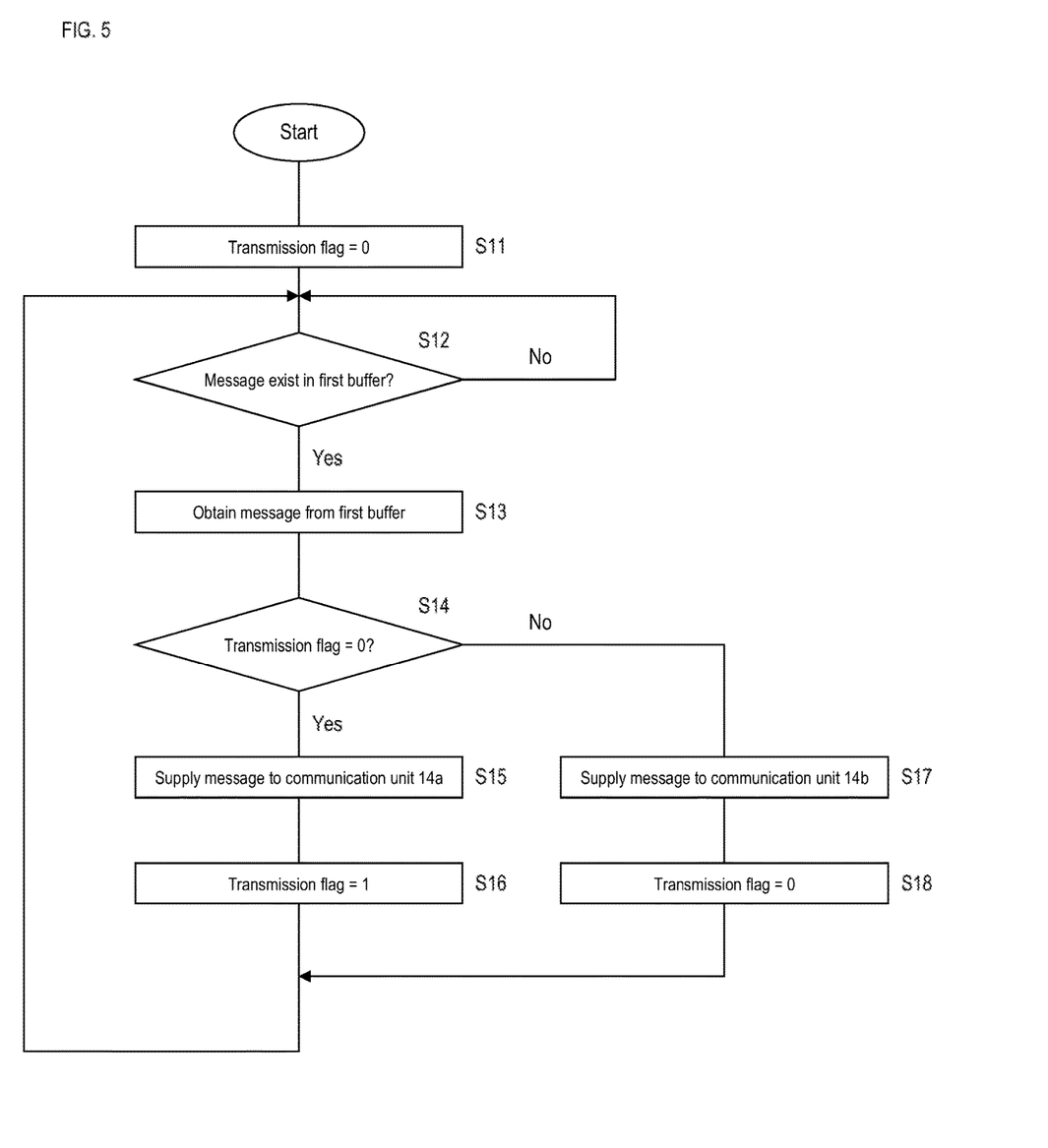
FIG. 5 is a flowchart showing the procedure of message classification processing that is performed by a GW according to an embodiment of the present disclosure.

FIG. 5 is a flowchart showing the procedure of message transmission processing that is performed by a GW 10 according to this embodiment. Note that this flowchart shows transmission processing for a higher-priority message stored in the first buffer 17a out of the two buffers of the communication buffer 17. In addition, in this flowchart, a transmission flag indicating one of the two communication units 14 from which a message was transmitted is used in the processing, but this flag is realized using a storage region such as a register of the processing unit 11, for example, and the value of 0 or 1 can be set. The transmission processing unit 11c of the GW 10 according to this embodiment first initializes the value of the transmission flag to 0 (step S11).

Next, the transmission processing unit 11c determines whether or not a message is stored in the first buffer 17a (step S12). If no message is stored in the first buffer 17a (step S12: NO), the transmission processing unit 11c waits until a message is stored in the first buffer 17a. If a message is stored in the first buffer 17a (step S12: YES), the transmission processing unit 11c obtains this message from the first buffer 17a (step S13).

Next, the transmission processing unit 11c determines whether or not the value of the transmission flag is 0 (step S14). If the value of the transmission flag is 0 (step S14: YES), the transmission processing unit 11c supplies the message obtained in step S13 to the communication unit 14a (step S15), and transmits this message to the other GW 10. The transmission processing unit 11c sets the value of the transmission flag to 1 (step S16), and returns the procedure to step S12.

If the value of the transmission flag is not 0 (step S14: NO), in other words, if the value of the transmission flag is 1, the transmission processing unit 11c supplies the message obtained in step S13, to the communication unit 14b (step S17), and transmits this message to the other GW 10. The transmission processing unit 11c sets the value of the transmission flag to 0 (step S18), and returns the procedure to step S12.

Figure 6:
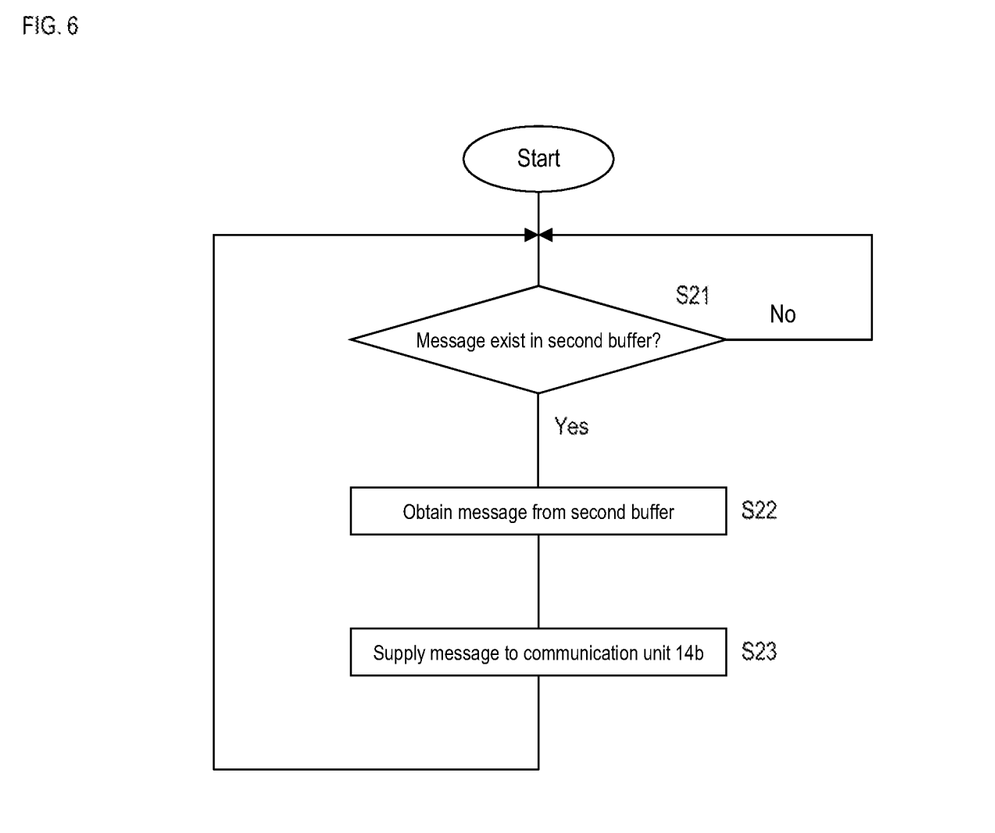
FIG. 6 is a flowchart showing the procedure of message classification processing that is performed by a GW according to an embodiment of the present disclosure.

FIG. 6 is a flowchart showing the procedure of message transmission processing that is performed by a GW 10 according to this embodiment. Note that this flowchart shows transmission processing for a lower-priority message stored in the second buffer 17b out of the two buffers of the communication buffer 17. The transmission processing unit 11c of the GW 10 according to this embodiment determines whether or not a message is stored in the second buffer 17b (step S21). If no message is stored in the second buffer 17b (step S21: NO), the transmission processing unit 11c waits until a message is stored in the second buffer 17b. If a message is stored in the second buffer 17b (step S21: YES), the transmission processing unit 11c obtains this message from the second buffer 17b (step S22). The transmission processing unit 11c supplies the obtained message to the communication unit 14b (step S23), transmits this message to the other GW 10, and returns the procedure to step S21.

Figure 7:
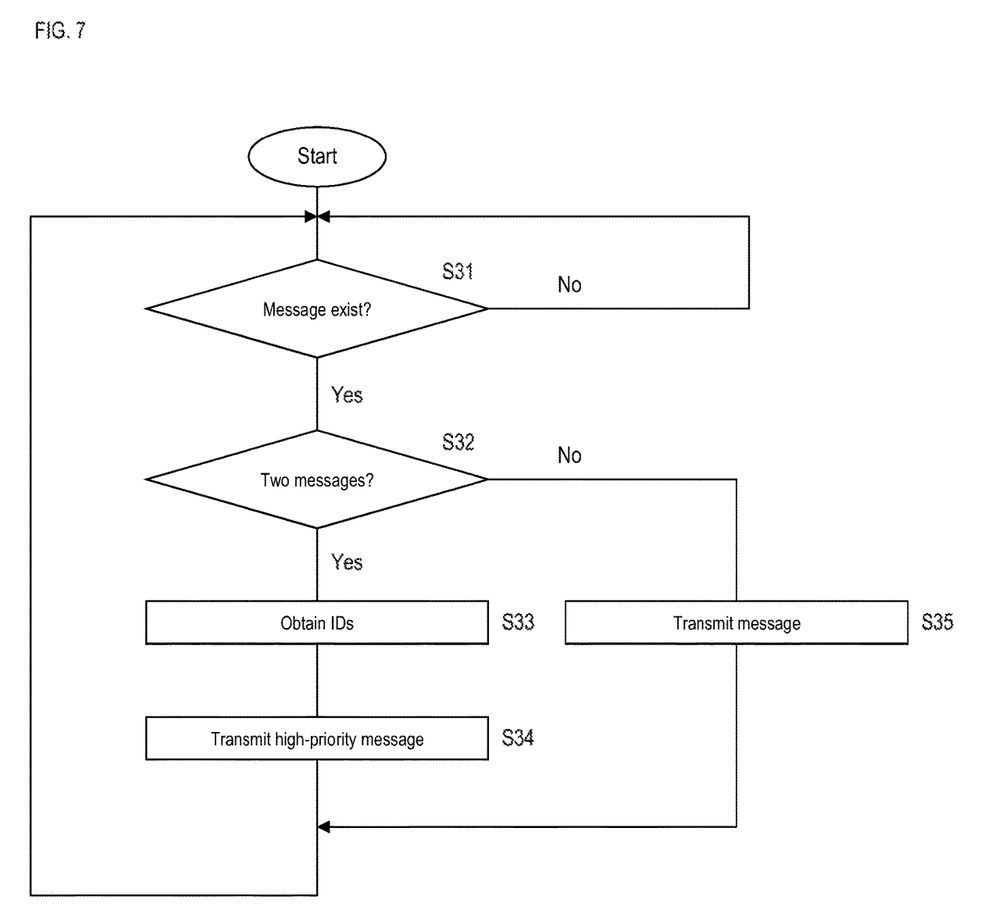
FIG. 7 is a flowchart showing the procedure of message transmission processing that is performed by a GW according to an embodiment of the present disclosure.

FIG. 7 is a flowchart showing the procedure of message transmission processing that is performed by a GW 10 according to this embodiment, the processing being performed by the communication unit 14b that is supplied with messages from both the first buffer 17a and the second buffer 17b. The communication unit 14b of the GW 10 according to this embodiment includes, for example, a plurality of registers that store messages that are to be transmitted, and may be supplied with messages to be transmitted, simultaneously from the transmission processing unit 11c that performs transmission processing of messages stored in the first buffer 17a and the transmission processing unit 11c that performs transmission processing of messages stored in the second buffer 17b. Note that, in this embodiment, a configuration is adopted in which the processing in the flowchart shown in FIG. 7 is performed by the communication unit 14b, but a configuration may also be adopted in which the processing unit 11 performs this processing.

The communication unit 14b of the GW 10 according to this embodiment determines whether or not a message to be transmitted to the other GW 10 has been supplied from the processing unit 11 (step S31). If no message has been supplied (step S31: NO), the communication unit 14b waits until a message that is to be transmitted is supplied. If a message has been supplied (step S31: YES), the communication unit 14b determines whether or not two messages, namely a message from the first buffer 17a and a message from the second buffer 17b have been supplied (step S32).

When two messages that are to be transmitted are supplied (step S32: YES), the communication unit 14b obtains the IDs of these two messages (step S33).

The communication unit 14b determines priorities based on the IDs of the two messages, outputs a higher-priority message to the communication line 6, thereby transmitting the message to the other GW 10 (step S34), and returns the procedure to step S31. If two messages to be transmitted are not supplied (step S32: NO), in other words, if only one of a message from the first buffer 17a and a message from the second buffer 17b is supplied, the communication unit 14b outputs the supplied message to the communication line 6, thereby transmitting the message to the other GW 10 (step S35), and returns the procedure to step S31.

Note that, in message transmission processing that is performed by the communication unit 14a to which messages are supplied only from the first buffer 17a, it suffices for supplied messages to be simply transmitted in order, and thus illustration of a flowchart thereof is omitted.

Overview

In the in-vehicle communication system 1 according to this embodiment that has the above-described configuration, the two GWs 10 are connected via the two communication lines 6. Each of the GWs 10 includes two communication units 14 that transmit/receive messages to/from the other GW 10 via the two communication lines 6. The GW 10 classifies messages to be transmitted to the other GW 10 into two groups, namely the first group and the second group, in accordance with the priorities (IDs) assigned to these messages. The two communication units 14a and 14b are allocated to the first group into which a higher-priority message is classified, and one communication unit 14b is allocated to the second group into which a lower-priority message is classified. The GWs 10 distributes messages classified into the first group and the second group, to communication units 14 allocated to the respective groups, thereby transmitting the messages to the other GW 10.

Accordingly, each GW 10 according to this embodiment transmits a higher-priority message to the other GW 10 using a larger number of communication lines 6, and transmits a lower-priority message to the other GW 10 using a smaller number of communication lines 6. Thus, it is possible to increase the communication capacity for higher-priority messages, and suppress the occurrence of a delay in transmission of higher-priority messages.

In addition, the GW 10 according to this embodiment alternately supplies, to the communication units 14a and 14b, messages classified into the first group to which the two communication units 14a and 14b are allocated. Accordingly, the GW 10 can transmit higher-priority message classified into the first group to the other GW 10, equally using the two communication units 14a and 14b.

In addition, in the GW 10 according to this embodiment, when two messages are simultaneously supplied from the first group and the second group, the communication unit 14b that may be supplied with messages from two groups, namely the first group and the second group preferentially transmits a higher priority message first. After transmitting the higher-priority message, the communication unit 14b transmits a lower-priority message. Accordingly, it is possible to suppress the occurrence of a delay in transmission of a higher-priority message without being interrupted by a lower-priority message.

Note that, in this embodiment, the GWs 10 each mounted as an in-vehicle communication apparatus in the vehicle 100 have been described as an example, but the in-vehicle communication apparatus is not limited to a GW 10. For example, the ECUs 3 may have similar message classification and transmission functions. The in-vehicle communication apparatus may be an apparatus different from a GW 10 and an ECU 3. In addition, a configuration is adopted in which the two GWs 10 are connected via the two communication lines 6, but there is no limitation thereto, and the two GWs 10 may be connected via three or more communication lines 6. In addition, a configuration is adopted in which the two GWs 10 are mounted in the vehicle 100, but there is no limitation thereto, and one or three or more GWs 10 may also be mounted in the vehicle 100. In addition, a configuration is adopted in which each of the GWs 10 classifies messages to be transmitted to the other GW 10, into two groups, namely the first group and the second group, but there is no limitation thereto, and the messages may also be classified into three or more groups.

MODIFIED EXAMPLE 1

Figure 8:
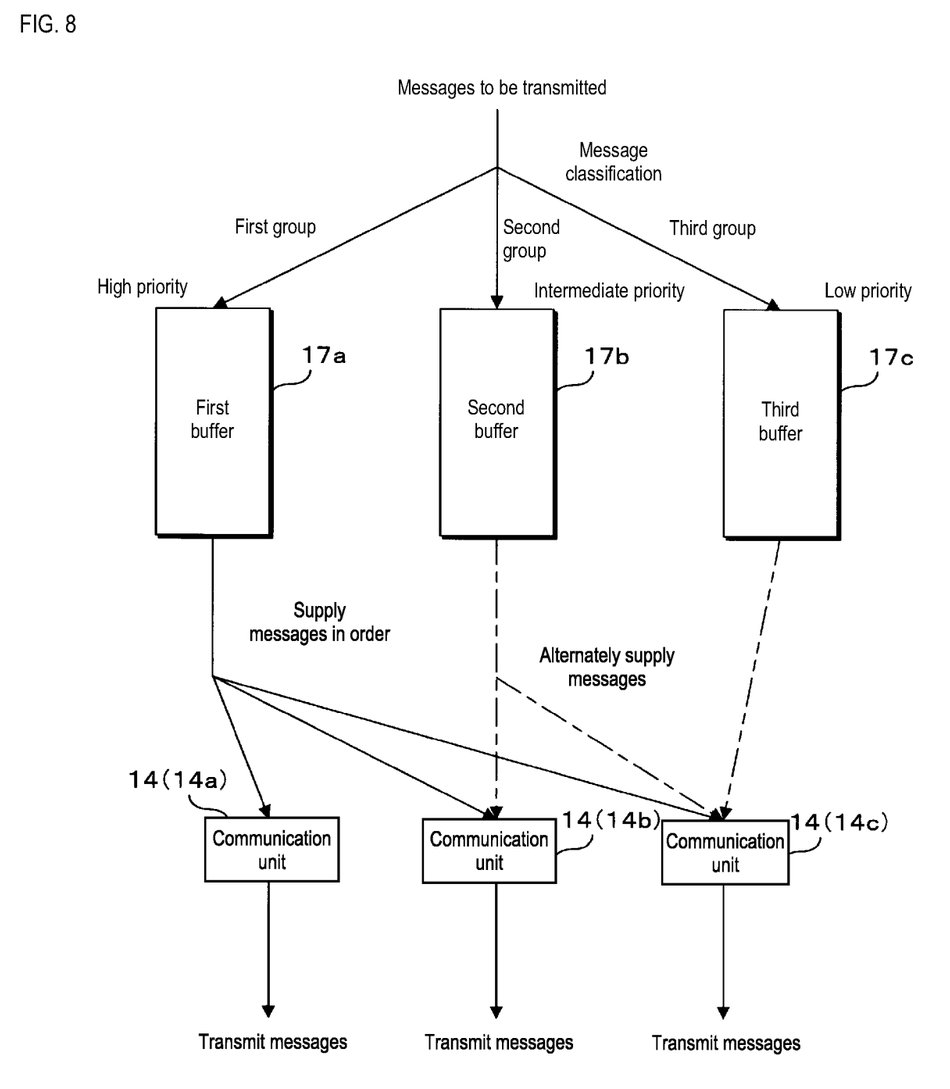
FIG. 8 is a schematic diagram for illustrating processing that is performed by a GW according to Modified Example 1, the processing being for transmitting messages to another GW.

FIG. 8 is a schematic diagram for illustrating processing that is performed by a GW 10 according to Modified Example 1, the processing being for transmitting a message to another GW 10. In the in-vehicle communication system 1 according to Modified Example 1, the two GWs 10 are connected via three communication lines 6. The GW 10 according to Modified Example 1 includes three communication units 14 that communicate with the other GW 10, and three buffers, namely a first buffer 17a to a third buffer 17c, are provided in the communication buffer 17.

The GW 10 according to Modified Example 1 classifies messages to be transmitted to the other GW 10, into three groups, namely first to third groups based on the priorities (IDs) assigned to these messages. A higher-priority message is classified into the first group. An intermediate-priority message is classified into the second group. A lower-priority message is classified into the third group. For example, the GW 10 stores a first threshold value and a second threshold value as references for determining a priority, classifies a message with a higher priority than the first threshold value into the first group, classifies a message with a lower priority than the second threshold value into the third group, and classifies a message with a priority between the first threshold value and the second threshold value, into the second group. The GW 10 stores a message classified into the first group, in the first buffer 17a, stores a message classified into the second group, in the second buffer 17b, and stores a message classified into the third group, in the third buffer 17c.

In the GW 10 according to Modified Example 1, the three communication units 14a to 14c are allocated to the first group, two communication units 14b and 14c are allocated to the second group, and one communication unit 14c is allocated to the third group. In addition, in the processing unit 11 of the GW 10, three transmission processing units 11c are provided in association with the first to third groups. The transmission processing unit 11c corresponding to the first group obtains messages stored in the first buffer 17a in order from the oldest message, and supplies the obtained messages to the three communication units 14a to 14c in a predetermined order, for example, in order of the communication unit 14a, the communication unit 14b, the communication unit 14c, the communication unit 14a, . . . , thereby transmitting the messages to the other GW 10. The transmission processing unit 11c corresponding to the second group obtains messages stored in the second buffer 17b in order from the oldest message, and alternately supplies the messages to the two communication units 14b and 14c, thereby transmitting the messages to the other GW 10. The transmission processing unit 11c corresponding to the third group obtains messages stored in the third buffer 17c in order from the oldest message, and supplies the messages to the one communication unit 14c, thereby transmitting the messages to the other GW 10. Message transmission processing is performed by the three transmission processing units 11c asynchronously and in parallel.

The communication units 14b and 14c out of the three communication units 14 of the GW 10 according to Modified Example 1 may be supplied with messages from a plurality of transmission processing units 11c simultaneously. If a plurality of messages are simultaneously supplied, the communication units 14b and 14c compare the priorities of these messages, and transmit messages in the order of highest priority.

MODIFIED EXAMPLE 2

Figure 9:
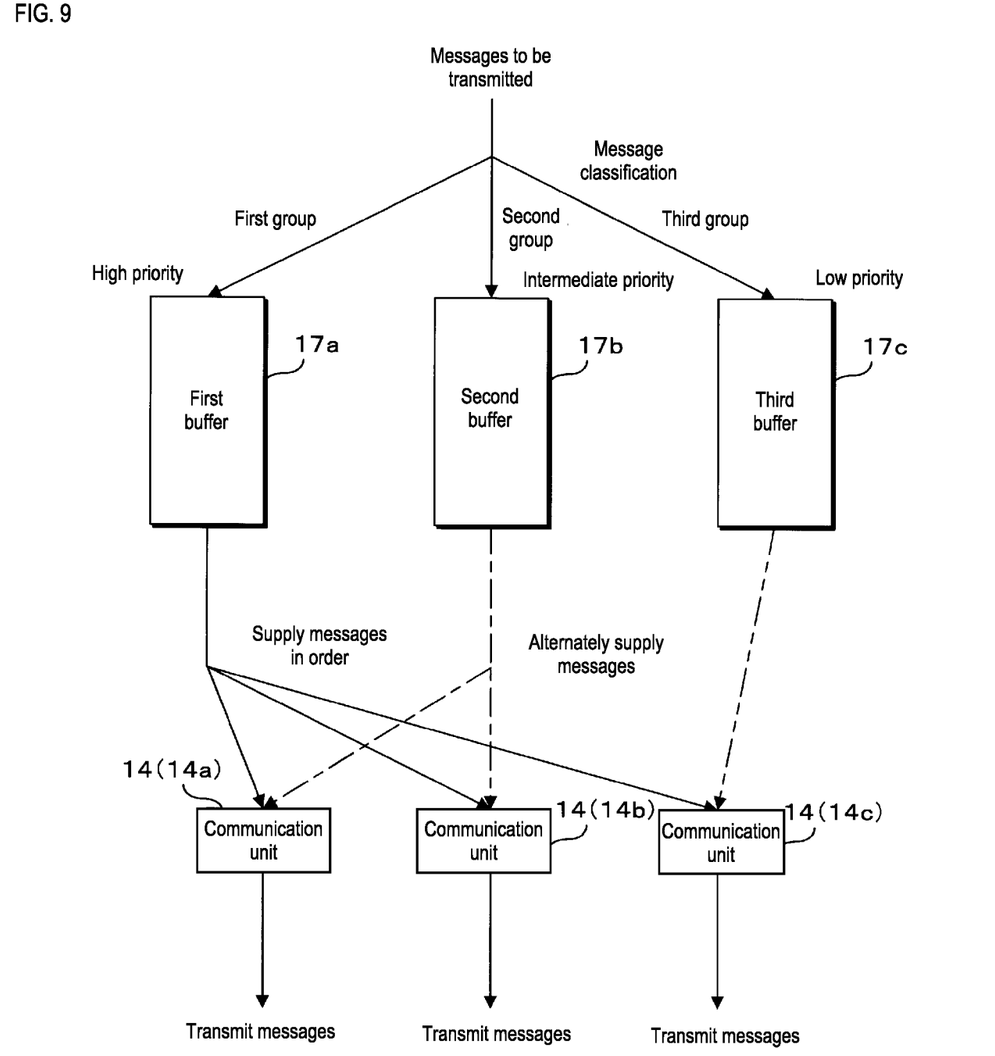
FIG. 9 is a schematic diagram for illustrating processing that is performed by a GW according to Modified Example 2, the processing being for transmitting messages to another GW.

FIG. 9 is a schematic diagram for illustrating processing that is performed by a GW 10 according to Modified Example 2, the processing being for transmitting a message to another GW 10. Similarly to the GW 10 according to Modified Example 1, the GW 10 according to Modified Example 2 includes three communication units 14a to 14c, and three buffers, namely a first buffer 17a to a third buffer 17c, are provided in the communication buffer 17. Similarly to the GW 10 according to Modified Example 1, the GW 10 according to Modified Example 2 classifies messages to be transmitted to the other GW 10, into the first to third groups in accordance with their priorities, and stores the messages in the first buffer 17a to the third buffer 17c of the communication buffer 17.

In the GW 10 according to Modified Example 2, three communication units 14, namely the communication units 14a to 14c are allocated to the first group, and two communication units 14, namely the communication units 14a and 14b are allocated to the second group, and one communication unit 14c is allocated to the third group. Accordingly, the GW 10 according to Modified Example 2 has a configuration in which allocation of communication units 14 to the second group is different from the GW 10 according to Modified Example 1. The transmission processing unit 11c corresponding to the second group obtains messages stored in the second buffer 17b in order from the oldest message, and alternately supplies the messages to the two communication units 14a and 14b, thereby transmitting the messages to the other GW 10.

Each of the three communication units 14a to 14c of the GW 10 according to Modified Example 2 may be supplied with messages from two buffers simultaneously. When two message are simultaneously supplied, the communication units 14a to 14c compare the priorities of these two messages, and transmit a higher-priority message first, and then transmit a lower-priority message.

In the in-vehicle communication system 1 according to Modified Examples 1 and 2 that has the above-described configuration, it is possible to further increase the communication capacity between the two GWs 10 by connecting the two GWs 10 via three communication lines 6. In addition, as a result of the GW 10 classifying messages to be transmitted to the other GW 10, into three groups, and performing transmission processing, it is possible to perform message transmission appropriate for the priorities of the messages.

Note that, in Modified Examples 1 and 2, a configuration is adopted in which two GWs 10 are connected via three communication lines 6, and each of the GWs 10 includes three communication units 14 that communicate with the other GW 10, but there is no limitation thereto, and the two GWs 10 may be connected via four or more communication lines 6. In addition, in Modified Examples 1 and 2, a configuration is adopted in which each of the GWs 10 classifies messages into three groups, but there is no limitation thereto, and messages may also be classified into four or more groups.

In addition, in the above-described in-vehicle communication system 1, a configuration has been illustrated in which the number of communication lines 6 (in other words, the number of communication units 14 of each of the GWs 10) that connect the two GWs 10 is the same as the number of groups into which messages to be transmitted to the other GW 10 are classified, but there is no limitation thereto. For example, a configuration may also be adopted in which the GW 10 classifies messages into three groups and includes four communication units 14. In the case of such a configuration, it suffices for a large number of communication units 14 to be allocated to a group into which higher-priority messages are classified, and any allocation of communication units 14 for each group may be adopted. In addition, for example, a configuration may be adopted in which the GW 10 classifies messages into four groups and includes three communication units 14.

Each apparatus in the in-vehicle communication system includes a computer constituted by a microprocessor, a ROM, a RAM, and the like. A computation processing unit such as a microprocessor reads out a computer program that includes some or all of the steps in a sequence chart or a flowchart such as those shown in FIGS. 4 to 7, from a storage unit such as a ROM or a RAM, and executes the program. Computer programs of these apparatuses can be installed from an external server apparatus or the like. Also, computer programs of these apparatuses are distributed in a state of being stored in a recording medium such as a CD-ROM, a DVD-ROM, or a semiconductor memory.

The embodiments disclosed herein are to be considered as illustrative and non-limiting in all aspects. The scope of the present disclosure is indicated not by the above-stated meanings but by the claims, and all changes that come within the meaning and range of equivalency of the claims are intended to be embraced therein.

The invention claimed is:

1. An in-vehicle communication apparatus that is to be connected to another apparatus via a plurality of communication lines, the in-vehicle communication apparatus comprising:
   a plurality of transceivers that are provided respectively for the communication lines, and transmit/receive a message via the communication lines;
   a classification processing unit that performs processing for classifying messages that are to be transmitted to the other apparatus, into a plurality of groups in accordance with priorities of the messages; and
   a message transmission processing unit that distributes messages classified into each of the plurality of groups, to one or more of the plurality of transceivers allocated to the group, and thereby transmits the messages to the other apparatus,
   wherein a number of the plurality of transceivers allocated to a group into which a higher-priority message is classified is larger than a number of the plurality of transceivers allocated to a group into which a lower-priority message is classified.

2. The in-vehicle communication apparatus according to claim 1, wherein the message transmission processing unit distributes messages to the plurality of transceivers in a predetermined order.

3. The in-vehicle communication apparatus according to claim 2, wherein, when a plurality of messages classified into a plurality of groups are supplied from the message transmission processing unit, the transceiver transmits a higher-priority message first.

4. The in-vehicle communication apparatus according to claim 1, wherein, when a plurality of messages classified into a plurality of groups are supplied from the message transmission processing unit, the number of the plurality of transceivers transmits a higher-priority message first.

5. An in-vehicle communication apparatus that is to be connected to another apparatus via two communication lines, the in-vehicle communication apparatus comprising:
   two transceivers that are provided respectively for the communication lines, and transmit/receive a message via the communication lines;
   a classification processing unit that performs processing for classifying messages that are to be transmitted to the other apparatus, into two groups in accordance with priorities of the messages;
   a message transmission processing unit that distributes messages classified into each of the two groups, to one or more transceivers allocated to the group, and thereby transmits the messages to the other apparatus,
   wherein the two transceivers are allocated to a group into which a higher-priority message is classified, and
   one transceiver of the two transceivers is allocated to a group into which a lower-priority message is classified.

6. A communication program that causes an in-vehicle communication apparatus that is to be connected to another apparatus via a plurality of communication lines, and includes a plurality of transceivers that are provided respectively for the communication lines, and transmit/receive a message via the communication lines, to perform processing for:

classifying messages that are to be transmitted to the other apparatus, into a plurality of groups in accordance with priorities of the messages; and distributing messages classified into each of the plurality of groups, to one or more transceivers allocated to the group, and thereby transmitting the messages to the other apparatus, wherein the number of transceivers allocated to a group into which a higher-priority message is classified is larger than the number of transceivers allocated to a group into which a lower-priority message is classified.

7. A message transmission method, comprising:

by an in-vehicle communication apparatus that is connected to another apparatus via a plurality of communication lines, classifying messages that are to be transmitted to the other apparatus, into a plurality of groups in accordance with priorities of the messages, allocating, for each of the groups, one or more transceivers out of a plurality of transceivers that are provided respectively for the communication lines, and transmit/receive messages via the communication lines, and distributing messages classified into each of the plurality of groups, to one or more transceivers allocated to the group, thereby transmitting the messages to the other apparatus, wherein a number of transceivers allocated to a group into which a higher-priority message is classified is larger than a number of transceivers allocated to a group into which a lower-priority message is classified.

* * * * *